March 11, 1947.  H. J. FRAMHEIN  2,417,394
LIFT TRUCK
Filed Dec. 17, 1942  5 Sheets-Sheet 2
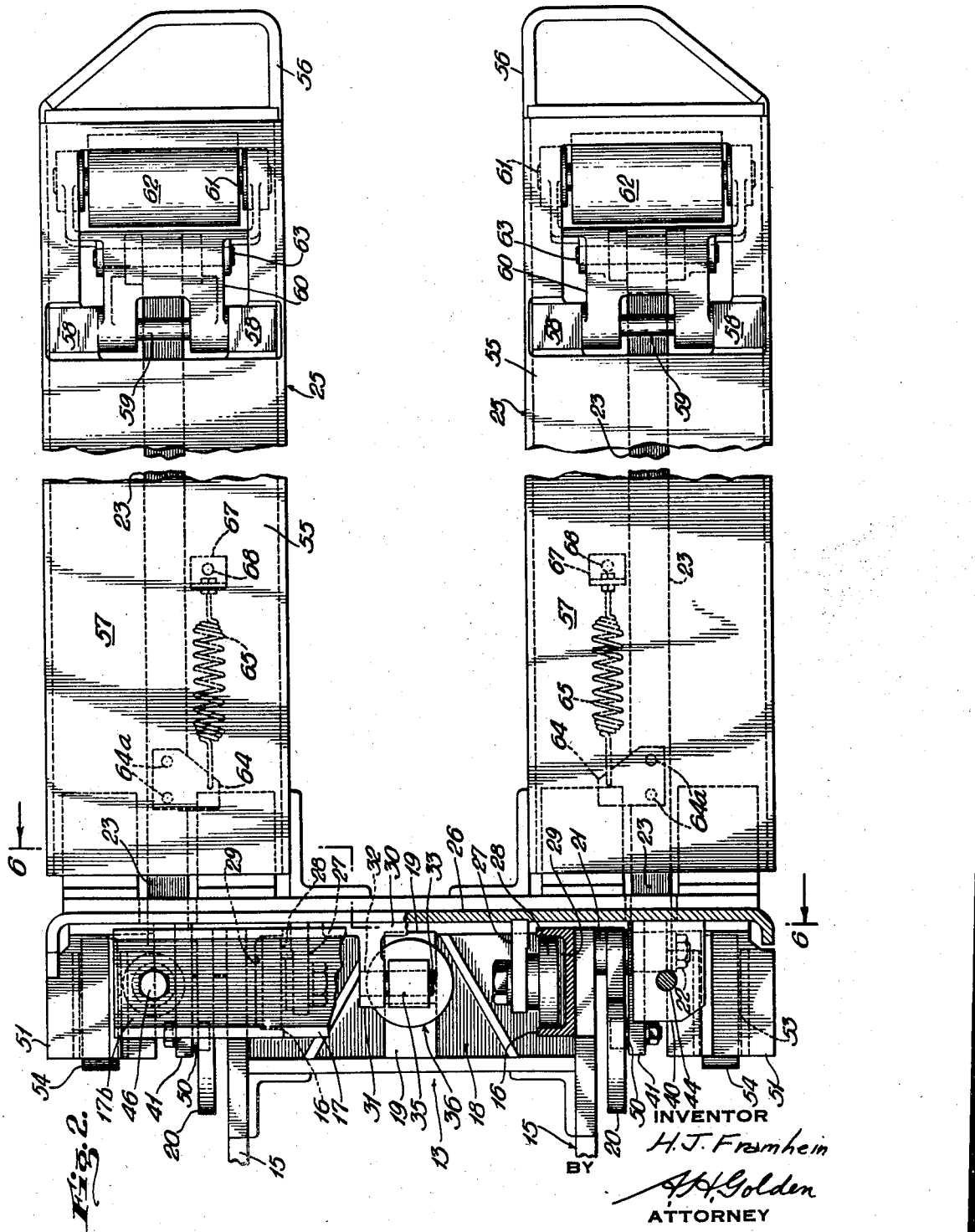
INVENTOR
H.J. Framhein
BY
H.H. Golden
ATTORNEY

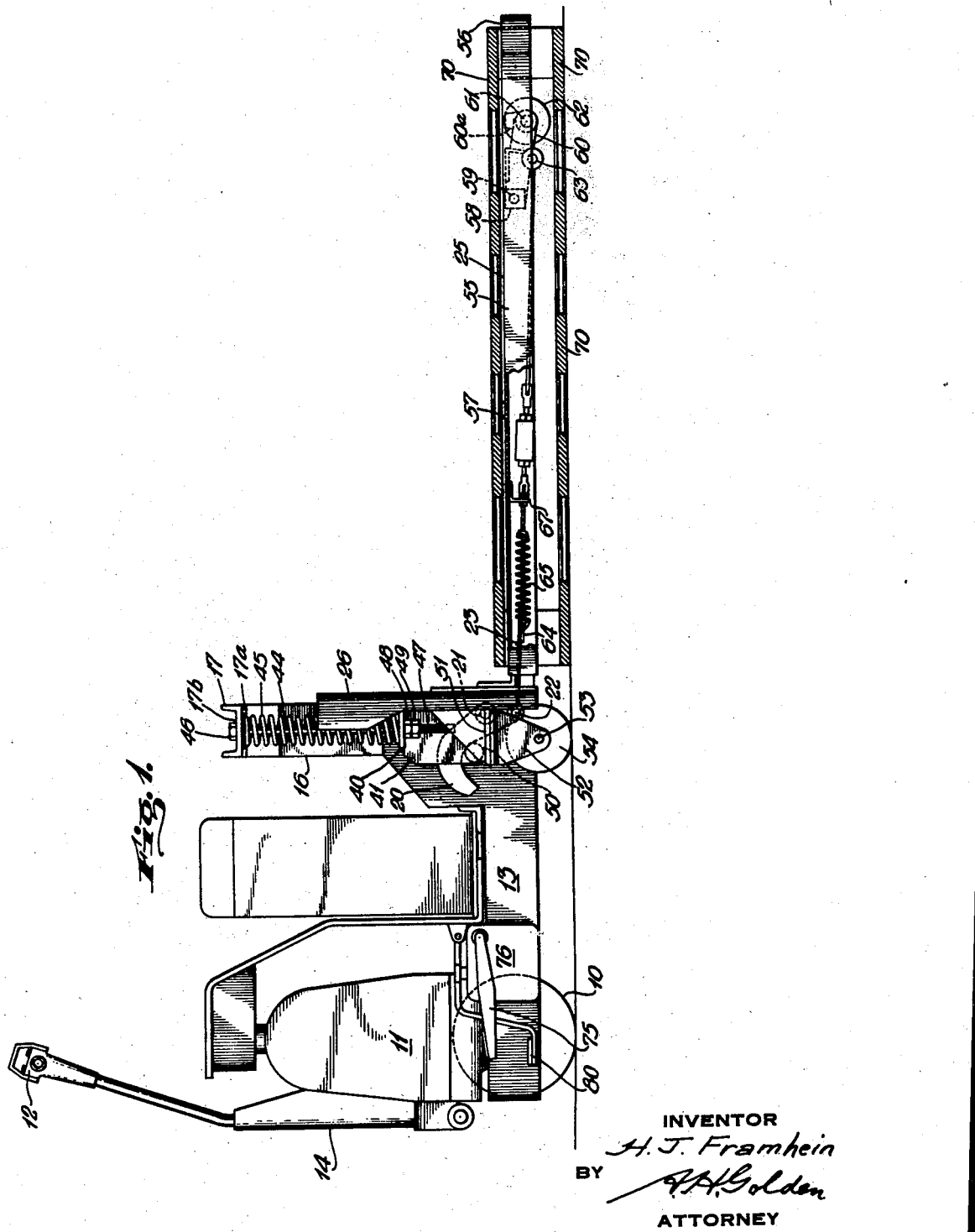

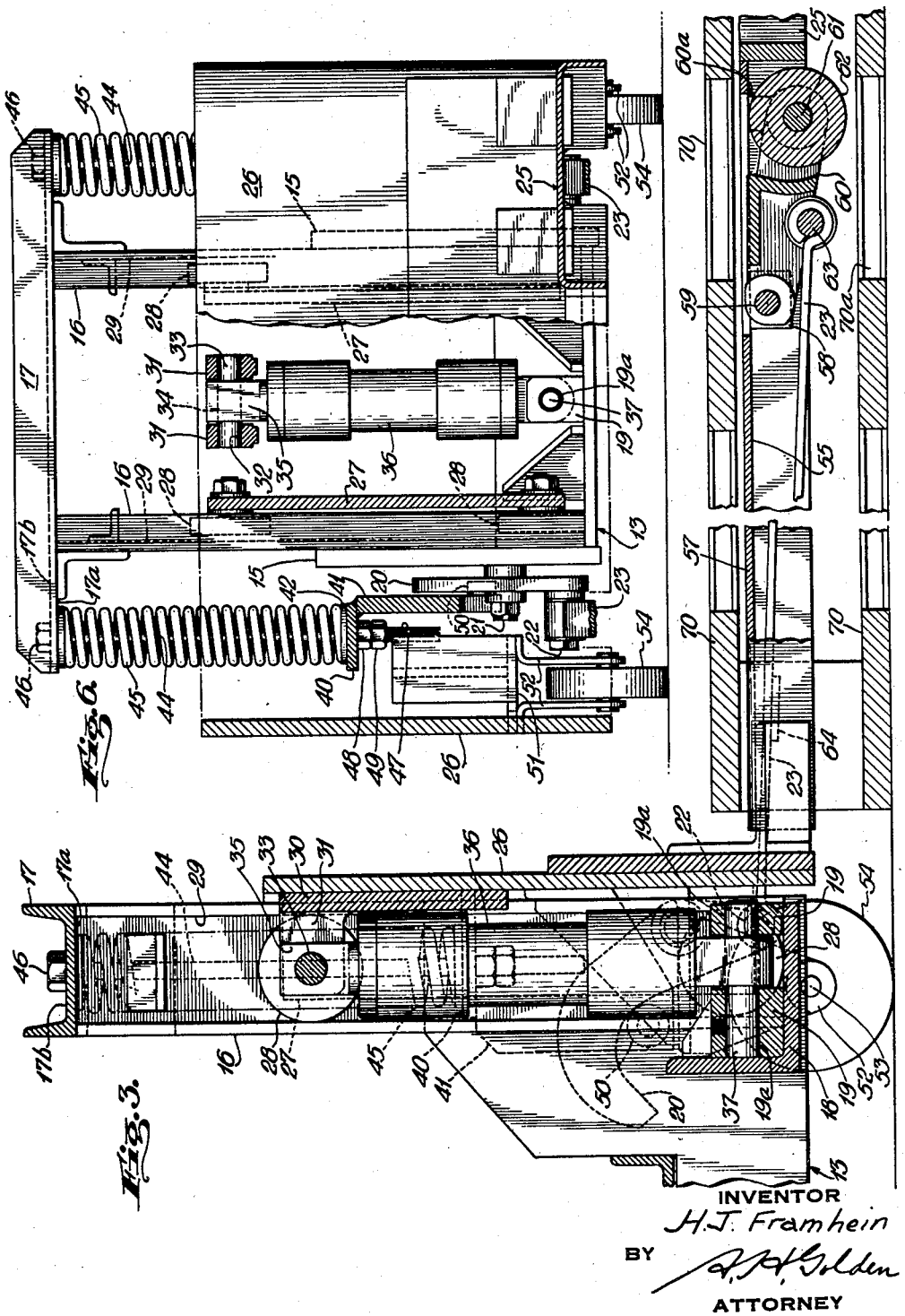

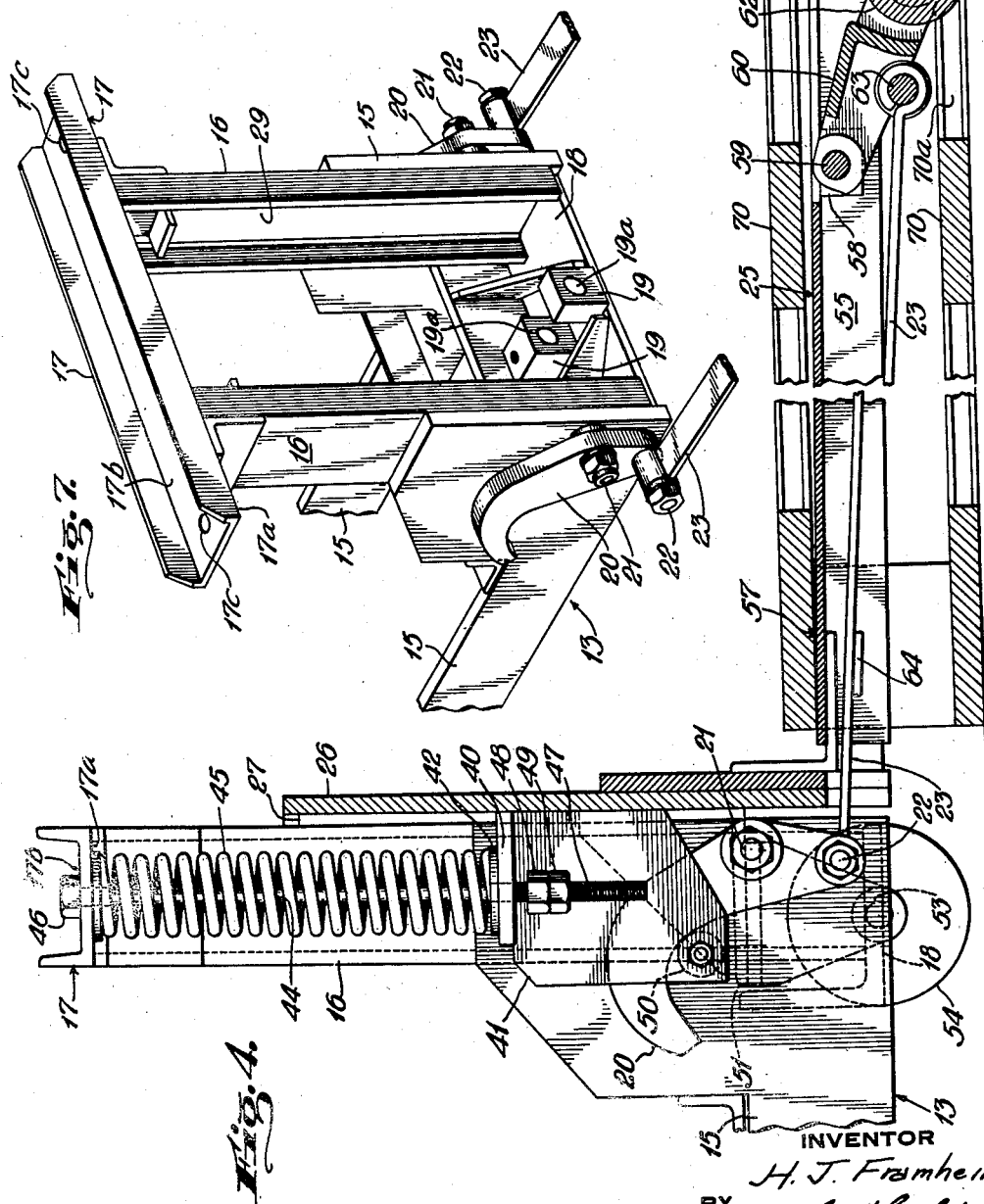

March 11, 1947. H. J. FRAMHEIN 2,417,394
LIFT TRUCK
Filed Dec. 17, 1942 5 Sheets-Sheet 5
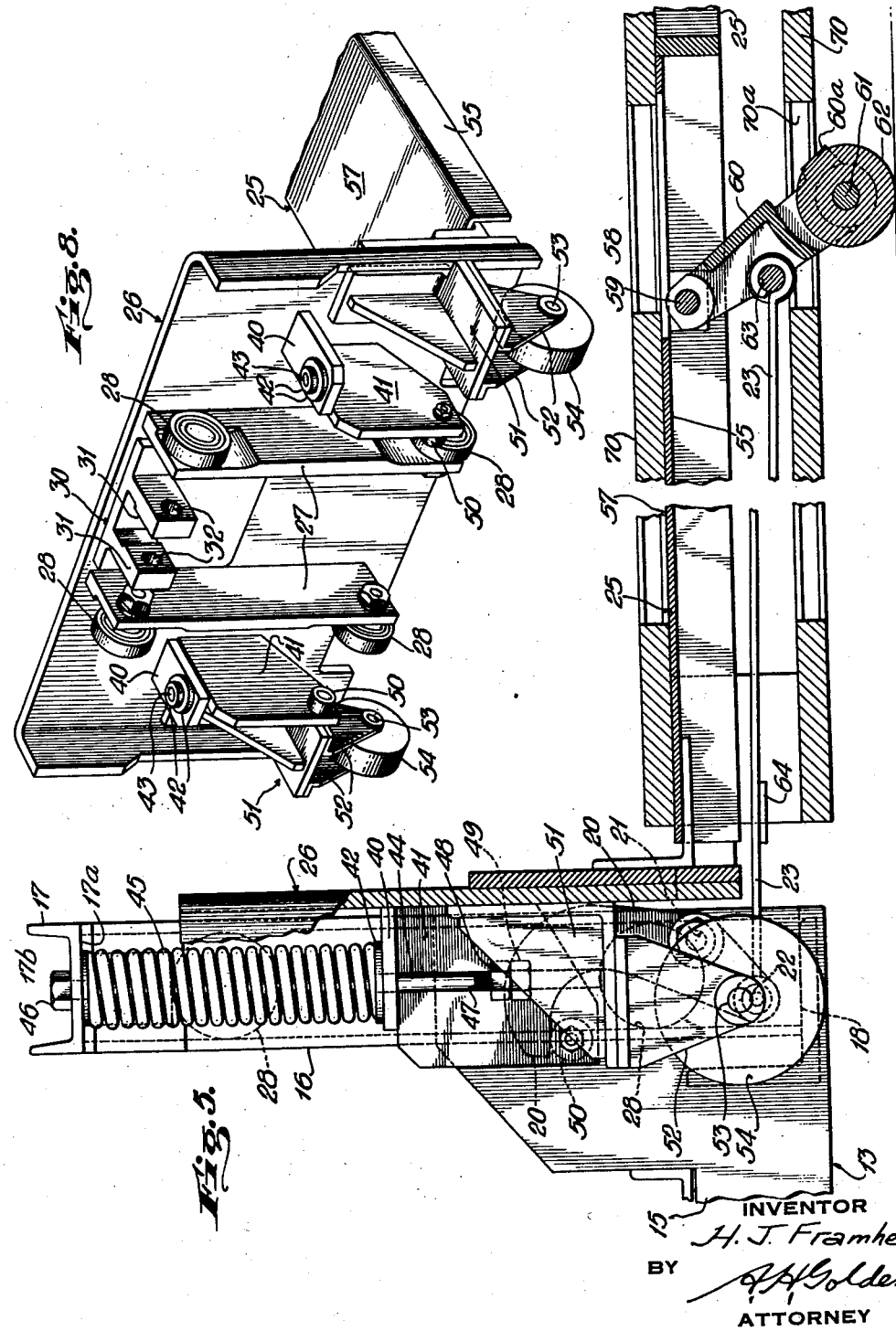
INVENTOR
H. J. Framhein
BY
A. H. Golden
ATTORNEY Patented Mar. 11, 1947

2,417,394

UNITED STATES PATENT OFFICE 2,417,394

LIFT TRUCK

Herbert J. Framhein, Chicago, Ill., assignor to The Yale & Towne Manufacturing Company, Stamford, Conn., a corporation of Connecticut Application December 17, 1942, Serial No. 469,324

24 Claims. (Cl. 254—2)

This invention relates to an industrial truck, and more particularly to an industrial truck of the type having an elevating platform adapted to lift a skid. Even more particularly, my invention relates to an industrial truck of the type in which the platform is adapted to elevate a skid of the pallet type; that is, a skid having upper and lower floors between which the elevating platform of the truck is adapted to enter. After entering between the floors of the pallet the elevating platform is elevated and thus raises the pallet.

Trucks of the particular type are old and well known in the art, and usually have an elevating platform supported by rear lifting wheels that are generally pivotally mounted relatively to the platform. When the lifting wheels are moved on their mounting means relatively to the platform, they act to raise the platform. In actual operation, trucks of the particular type are manipulated so that the platform and the lifting wheels are positioned between the upper and lower floors of the pallet and with the lifting wheels placed between certain of the boards of the pallet. Thereafter, when the lifting wheels are moved with their mounting means relatively to the elevating platform of the truck, both the platform and the pallet are elevated, the wheels resting against the ground in the space between two of the boards of the pallet as set forth. A truck of this type is shown and described in the Quayle Patent No. 2,242,436 and in my earlier application Serial No. 432,177 filed on February 25, 1942, now Patent No. 2,399,596, dated April 30, 1946.

Because it is extremely difficult to move the elevating platform of a truck of the class described into a position between the floors of a pallet, it being necessary for the lifting wheels to move upwardly each time one of the floor boards of the pallet is encountered, much thought has been given to the problem of devising a pallet handling truck that may be more easily manipulated relatively to a pallet.

In the Quayle patent supra, the inventor conceived the idea of using rollers for assisting the wheels of the truck in moving upwardly each time a floor board of the pallet is encountered. Trucks of the type developed by Quayle have been in use in the industry for a considerable period of time and have been found relatively successful.

It is the broad object of my invention to contribute to the art a lift truck of the class described, in which the elevating platform of the truck, or the pallet elevating portion thereof, may more readily be manipulated between the upper and lower floors of a pallet. While I shall describe the truck of my invention as particularly adapted to solve the long standing problem that I have outlined, and which has long confronted the industry, it should be understood that the truck of my invention may be used in various other ways, since it contributes a readily manipulated and easily handled truck that is extremely desirable, all of which will appear quite clearly from the specification that follows.

A truck whereby the broad objectives of my invention are obtained is disclosed in my application Serial No. 458,035, filed September 11, 1942, under the title "Pallet truck." In that application, I disclose a truck in which the elevating platform is adapted to enter between the upper and lower floors of a pallet type of skid without interference of any sort because the lifting wheels under the elevating platform are maintained in an upward unobstructing position until actuated to lift the elevating platform. It will be helpful to an understanding of the present invention, if a brief review is given of the structure employed in the truck of my earlier application.

The structure of the said truck embodies a lifting head on which is mounted for lifting movement an elevating platform. The platform is of the type having a vertical standard adapted for lifting movement on an appropriate portion of the lifting head, and has a rather long extending horizontal platform secured to the standard and adapted for entry between the floors of a pallet type of skid. The lifting head of the truck is of course supported by the usual forward steering wheels, and because the lifting wheels under the horizontally extending platform are held in an upward unobstructing position, suitable intermediate wheels must be provided to support the lifting truck for movement in cooperation with the steering wheels of the lifting head. In the truck of my earlier application supra, the intermediate wheels are mounted on the lifting head and are adapted for movement vertically relatively to the said lifting head, springs being used to project the said wheels against the ground and into supporting relation to the lifting head. Thus, when the elevating platform is in its lowered position, the truck is movable on the forward steering wheels of the lifting head and the intermediate spring-pressed wheels. This yields a readily manipulated truck with an elevating platform adapted for easy entry between the pallet floors.

A lifting member is mounted on the lifting head and is preferably operated by a hydraulic ram. Means are provided so that the first movement of the lifting member by the ram moves the lifting wheels under the platform downwardly against the ground so that the said wheels assume the load of the pallet. Thereafter, the further lifting movement of the lifting member is adapted to raise the forward standard of the elevating platform while simultaneously continuing the lowering of the lifting wheels. This of course, effects the simultaneous lifting of the forward and rear ends of the elevating platform. As a further feature of the invention of the said earlier application, the spring-pressed support wheels are lifted as the forward end of the elevating platform is lifted so that the truck remains supported only by the steering wheels under the lifting head and the lifting wheels under the elevating platform.

The truck disclosed in my said earlier application contributes a basic important construction to the truck art, as well as an extremely novel operating conception. The truck to be disclosed in this application is based on the operating conception of my first truck, but has the advantage of eliminating a number of parts that are found in my earlier truck. Thus, in the truck I shall show and claim in this application, the spring-pressed intermediate wheels and their rather expensive mounting structure are eliminated. Instead, I use intermediate support wheels that are mounted on the elevating platform so that as the elevating platform is raised the said wheels are raised with the platform. A further feature of the present application is the elimination of the lifting member that is actuated by the hydraulic lifting means of my earlier application. Thus, I apply the hydraulic lifting means directly to the standard of the elevating platform in my present application so that the immediate movement of the hydraulic lifting means effects the immediate movement of the standard of the elevating platform. The rear lifting wheels are also adapted for immediate movement through mechanism that is arranged so that their immediate movement is at a considerably faster rate than the movement of the standard of the elevating platform. The arrangement is such that during the period that the elevating platform is moving to contact the load of the pallet skid, the relatively swift movement of the lifting wheels will bring those wheels downwardly against the ground so that they may assume their share of the load of the elevating pallet at just about the moment that the platform contacts the pallet. Thereafter, the elevating platform of the truck is lifted at both its ends and at the same rate of speed.

Those skilled in the art will appreciate that with some pallets the platform of the truck may contact the underside of the pallet floor before the lifting wheels contact the ground. In that case, there may be a slight momentary tilting of the truck, but such tilting will not be serious and will not affect the operation of the truck.

I have thus outlined the more important features of the truck of this application relatively to the basic concept and structure of my earlier application in order that the extremely important contribution of the present application may be understood and appreciated. There are a number of important features of the present invention that I have not discussed generally because those features will be better understood and appreciated from a reading of the specification that follows. In the claims of this application, I shall claim not only those features I have discussed but also those other features that will become apparent from a reading of the specification. It is thought that the contribution of this application is a broad one and that the claims to be granted me should be sufficiently broad to prevent those skilled in the art from utilizing my contribution by the designing of equivalent structures operating under the basic concept of my invention.

For a description of my invention, I shall now refer to the drawings wherein

Fig. 1 is a vertical view of the entire truck assembly showing the elevating platform inserted between the upper and lower floors of a pallet type skid.

Fig. 2 is a vertical plan view partially cut away, and partially in section, showing the construction of the rear part of my truck.

Fig. 3 is a vertical section of the rear of my truck illustrating its construction and showing the lifting wheels under the elevating platform and in their initial position prior to their actuation by the lifting mechanism.

Fig. 4 is a view similar to Fig. 3 but taken along a different section and illustrating the rear lifting wheels in contact with the ground and the intermediate support wheels slightly elevated, the platform of the truck being in contact with the floor of the pallet at its front end.

Fig. 5 is a view similar to Fig. 4 illustrating the truck parts with the elevating platform fully lifted.

Fig. 6 is a section taken along lines 6—6 of Fig. 2.

Fig. 7 is a perspective view of the lifting head of my truck looking from the rear towards the front thereof.

Fig. 8 is a perspective view of the front end of the standard of the elevating platform of my truck.

Referring now more particularly to the drawings and especially Fig. 1, my invention is shown incorporated in a truck of the motorized type. In the said truck, the forward steering wheels 10 are adapted for traction movement by a motor traction unit contained within the casing 11. The casing 11 and the wheels 10 are rotatable as a unit relatively to the lifting head 13 of the truck by a steering lever 14, the end of which has switch mechanism 12 for controlling the traction motor with the casing 11. The particular parts thus described are well known in the art and are part of a construction now manufactured by the Automatic Transportation Co., a division of the Yale & Towne Manufacturing Co., the owner of this application. The construction may be seen in my application Serial No. 390,931, filed April 29, 1941, now Patent No. 2,327,583, dated August 24, 1943.

The rear portion of the lifting head of the truck is probably best illustrated in Fig. 7 and may also be studied in Figs. 2, 3, 5 and 6. Referring to those figures, it will be noted that the said lifting head has horizontally extending main beams 15 to which are secured, as by welding or any other suitable means, a pair of vertical channelled uprights 16. These uprights 16 are braced at their upper ends by a horizontal channel member 17 secured to the vertical uprights 16 in the manner illustrated. It may be well at this point, to indicate that the preferred method for fabricating the several parts of my truck will be referred to only in a general way, the drawings being relied upon to show the method of fabrication. Those skilled in the art will of course appreciate that at the present time fabrication of trucks of the particular class is mainly through bolting, welding and riveting, with welding being generally preferred. Naturally, as materials and production methods change, the fabrication of my truck will also be changed and such changes bear no relation whatsoever to my contribution to the art.

The lower ends of the uprights 16 are connected by a horizontal plate 18. Secured to that plate and adequately reinforced are a pair of mounting blocks 19 for a hydraulic lifting unit to be described presently. At each side of the lifting head 13 is a lifting cam 20 pivoted on a shaft 21 relatively to a beam 15, and pivoted through a pin 22 to each of the lifting cams 20 is a tension rod 23 to be referred to in more detail hereinafter.

The elevating platform of my truck is of the U-type having a pair of legs 25 and a vertical standard 26 secured as illustrated in the drawings to the legs 25. The construction of the vertical standard 26 of the elevating platform, now to be described, is probably best illustrated in Fig. 3, but parts thereof are also well shown in several of the other figures and more particularly in Figs. 3 and 6.

Welded to the forward portion of the vertical standard 26 are a pair of spaced plates 27, and mounted on these plates are upper and lower rollers 28 adapted for movement in the channels 29 of the vertical uprights 16 of the lifting head 13. The construction and mounting of the rollers 28 is conventional and well known in the industrial truck art, and no further reference thereto is herein necessary. At the upper end of the standard 26 there is secured a bracket 30 having a pair of ears 31 formed with bores 32. As probably best shown in Fig. 6, a horizontal pin 33 extends through the bores 32 of the ears 31 and into a bore 34 formed in the upper end of a ram 35 of a hydraulic lifting assembly the cylinder portion of which is designated by reference numeral 36. The cylinder 36 is pivoted through the short shaft 37 on the bearing blocks 19, the said shaft 37 traversing bores 19a formed in the said bearing blocks. It will thus be appreciated that the cylinder portion of the hydraulic lifting assembly is pivoted on the lifting head 13 while the ram 35 thereof is pivoted to the upper end of the standard 26 of the elevating platform. Obviously, upward lifting movement of the ram 35 will effect upward lifting movement of the standard 26 and of the elevating platform of which the standard is an integral part. It is further obvious that upward lifting movement of the standard 26 will be guided by the rollers 28 maintained within the channel grooves 29 of the uprights 16.

In the particular truck it is desirable that means be provided for pressing the elevating platform downwardly into its lowered position of Figs. 1 and 3. For the particular purpose, there is secured to the vertical standard 26, a pair of horizontal brackets 40 suitably reinforced by vertical brackets 41. Each bracket 40 carries a pair of spring guiding discs 42, and the discs and brackets have aligned bores 43 for traversal by a long bolt 44. Mounted about each bolt 44 is a spring 45, the upper end of the spring 45 resting against the lower surface 17a of the beam 17. Each bolt 44 has its head 46 resting on the upper surface 17b of the channel beam 17 and extends through the hole 17c downwardly through the center of spring 45 and the bores 43 of discs 42 and bracket 40. It is threaded at its lower end at 47 for coaction with a nut 48 and a lock nut 49. Through the said bolts 44 and the nuts 48 and 49, the extreme lowered position of the elevating platform standard 26 relatively to the lifting head 13 may be determined, it being obvious that the elevating platform cannot be lowered beyond its position of Fig. 6 determined by said nuts 48, 49. It is also quite readily perceived that the springs 45 will tend to press the elevating platform into its position of Fig. 6 to resist yieldingly upward movement of the platform standard 26 from the position of Fig. 6.

Each of the brackets 41 earlier described as secured to the vertical standard 26 in reinforcing relation to the brackets 40, carries a roller 50, the said rollers 50 being adapted for cooperation with the lifting cams 20 as will be more clearly indicated later in the specification. For the present, it is well to note that in Fig. 3 there is shown the relation of a roller 50 to one of the lifting cams 20 in the lowered position of the elevating platform. The relation of the lifting rollers 50 to the lifting cams 20 in the fully lifted position of the elevating platform, and in an intermediate lifted position is illustrated in Figs. 5 and 4 respectively, and reference will be made to those figures hereinafter.

Referring once again to Fig. 8, it will be noted that through a series of brackets at each side of the standard, denoted generally by the reference numeral 51, there is secured a pair of bearing plates 52 for rotatably mounting through the axle 53 an intermediate support wheel 54. The support wheels 54 are thus held in fixed vertical relation to the standard 26 of the elevating platform and are adapted for rotation on axles 53. In the form of invention herein illustrated, it is preferred that the support wheels 54 be mounted as illustrated, but it will be readily appreciated that they may be of the castor type if that is desirable. The relation of the intermediate support wheels 54 to the truck is such that when the elevating platform is in its full lowered position of Figs. 1 and 3, the intermediate wheels 54 are maintained against the ground and support the truck for movement.

I shall now describe one of the two legs 25 forming the elevating platform of my truck, and in doing so shall refer to Figures 2 and 4. Each leg 25 is formed of a pair of horizontally extending beams 55 joined at their rearward ends by a steel member 56. Supported on the beams 55 is a floor plate 57 that I have found desirable in trucks of the particular class. A pair of bearing lugs 58 are secured to the beams 55 and on these lugs is mounted a shaft 59. Mounted on the shaft 59 is a wheel supporting link 60 on which is carried through axle 61 a lifting wheel 62. Through the stub shaft 63 there is pivoted to the ling 60 a tension rod 23, the forward end of which it will be remembered is pivoted through the stub shaft 22 to a lifting cam 20.

In Fig. 2, it will be noted that a bracket 64 is riveted at 64a to each of the tension rods 23. A spring 65 is secured at one end to the bracket 64 and at its other end to a bracket 67 riveted at 68 to the floor plate 57. It is the function of each of the springs 65 to press the tension rods 23 into their position of Fig. 3 so as to hold the lifting wheels 62 in the upward position of Fig. 3. Simultaneously, the springs 65 act through the tension rods 23 to rotate the lifting cams 20 counterclockwise on shafts 21 so as to maintain those cams against the lifting rollers 50 of the brackets 41.

Having described in detail practically all of the parts of my new truck, I shall now outline one complete operating cycle of my truck to illustrate the cooperation of the several parts of my truck and their mode of operation.

Referring first to Figs. 1 and 3, the elevating platform of my truck is shown in its fully lowered position in which it is yieldingly maintained by the springs 45 pressing against the discs 42 of the brackets 40. The rods 44 through the nuts 48 and 49 limit the downward movement of the elevating platform relatively to the lifting head 13. The wheel supporting links 60 are maintained by the springs 65 in their upward position and away from the ground, while the lifting cams 20 are pressed effectively against the lifting rollers 50. With the parts of the truck in their particular position, it is of course obvious that it is possible to move the elevating platform into its relation to the pallet shown in Figs. 1 and 3 without hindrance, the truck being readily manipulated for this movement on the relatively short wheel base formed by its front steering and traction wheels 10 and the intermediate support wheels 54 of the elevating platform. It is well to consider that when the truck parts are in their position of Figs. 1 and 3 for such manipulation, it is the springs 45 that act to maintain the intermediate support wheels 54 in their support position, thereby contributing a very desirable and effective operation.

It will be noted that the floor plates 57 of the legs 25 of the elevating platform are shown in Figs. 1 and 3 in spaced relation to the underside of the upper floor 70 of the pallet so that it is possible to impart some lifting movement to the elevating platform before that platform encounters the floor 70. This relation of the truck platform to the pallet is utilized to advantage as will presently be set forth.

With the truck and pallet in the position of Figs. 1 and 3, if it be desired to raise the pallet, the operator presses on a treadle 75 of the lifting head 13 and thereby actuates a hydraulic pump mechanism contained within a housing 76 mounted on the head 13. This effects, in the usual manner understood by those skilled in the art, the vertical movement of the ram 35 mounted within the cylinder 36 of the hydraulic lifting assembly. Vertical movement of the ram 35 effects a vertical movement of the standard 26 of the elevating platform, such movement being guided by rollers 28 fitting within the channel grooves 29 of the vertical uprights 16 of the lifting head 13.

Initial movement of the standard 26 will bring it to the position of Fig. 4, raising the support wheels 54 from the ground against the resistance of springs 45. At the same time, the lifting rollers 50 will have moved to the position of Fig. 4 and will have rotated to a considerable extent the lifting cams 20. This rotation of the lifting cams 20 actuates rods 23 and wheel supporting links 60 and brings the wheels 62 to their position of Fig. 4, in which position they have entered the space 70a between the boards making up the lower floor 70 of the pallet. At the same time, the forward ends of the floor plates 57 of the elevating platform will have contacted the lower surface of the upper floor 70 of the pallet. At this time it will be well to set forth that the lifting cams 20 are so formed that the initial vertical movement of the lifting rollers 50 will effect a very fast initial rotation of the said lifting cams 20. This relationship is desirable in order that while the elevating platform and its support wheels 54 move through the very short distance from the position of Fig. 3 to the position of Fig. 4 to bring plates 57 against the pallet floor, the lifting wheels 62 will move through the considerably greater distance required to bring those wheels against the ground and into position to support the pallet.

With the parts in the position of Fig. 4, it will now be appreciated that the entire truck is supported by the front steering and traction wheels 10 and by the rear lifting wheels 62. The intermediate wheels 54 are no longer positioned to support the truck for movement and therefore will not in any way hinder the movement of the truck on the forward traction and steering wheels 10 and the support wheels 54.

If it is now desired to complete the lifting movement of the elevating platform, it is only necessary to impart additional strokes to the treadle 75, whereupon the ram 35 will lift the standard 26 to its position of Fig. 5. In this position of the parts, the support wheels 62 are lowered to their full lifting position. They have of course been moved to this position by coaction of the lifting rollers 50 with the lifting cams 20. It will be interesting to note that in this position of the parts, the springs 45 have been compressed a rather considerable amount.

If it is now desired to lower the load, the operator need only press downwardly on a release pedal 80. This, in the usual conventional manner, will allow a lowering movement of the ram 35. The truck parts will then first move to the position of Fig. 4 under the weight of the pallet and the pressure of springs 45. Further movement will thereafter be contributed to the standard 26 by solely the springs 45 to effect a full lowering of the standard and the elevating platform to the position of Figs. 1 and 3. In that position of the parts, the lifting wheels 62 will have been elevated out of obstructing position by the springs 64 with lugs 60a limiting the movement of the links 60. The support wheels 54 are now against the ground, and are there maintained by the springs 45, so that the truck may once again be freely manipulated on the short wheel base of the wheels 54 and the forward steering and traction wheels 10.

I believe that the operation of my invention will now be fully understood.

I now claim:

1. In a truck of the class described, a lifting head, an elevating platform, means mounting said elevating platform for lifting movement relatively to said lifting head, support wheels mounted on said lifting head and said elevating platform and on which said truck is adapted for movement when said elevating platform is in its lowered position relatively to said lifting head, lifting wheels, means mounting said lifting wheels for movement bodily relatively to said platform and for lifting said platform when said wheels are lowered relatively to said platform, said mounting means maintaining said lifting wheels with the lowermost portions of the peripheries thereof above the plane of corresponding portions of said support wheels when said elevating platform is in its lowered position, and lifting means for effecting the movement of said lifting wheels relatively to said elevating platform.

2. In a truck of the class described, a lifting head, an elevating platform, means mounting said elevating platform for lifting movement relatively to said lifting head, support wheels mounted on said lifting head and said elevating platform and on which said truck is adapted for movement when said elevating platform is in its lowered position relatively to said lifting head, lifting wheels, means mounting said lifting wheels for movement bodily relatively to said platform and for lifting said platform when said wheels are lowered relatively to said platform, means whereby said mounting means are maintained with the lowermost portions of the peripheries of said lifting wheels above the plane of corresponding portions of said support wheels when said elevating platform is in its lowered position relatively to said lifting head, and lifting means for effecting the movement of said mounting means and lifting wheels relatively to said elevating platform.

3. In a truck of the class described, a lifting head, an elevating platform, means mounting said elevating platform for lifting movement relatively to said lifting head, support wheels mounted on said lifting head and said elevating platform and on which said truck is adapted for movement, a spring pressing said platform into its fully lowered position relatively to said lifting head so as to press the support wheels on said elevating platform against the ground, lifting wheels, means mounting said lifting wheels for movement bodily relatively to said platform and for lifting said platform when said wheels are lowered relatively to said platform, means whereby said mounting means are maintained with the lowermost portions of the peripheries of said lifting wheels above the plane of corresponding portions of said support wheels when said elevating platform is in its lowered position relatively to said lifting head, and lifting means for effecting the movement of said mounting means and lifting wheels relatively to said elevating platform.

4. In a truck of the class described, a lifting head, an elevating platform, means mounting said elevating platform for lifting movement relatively to said lifting head, support wheels for said truck mounted on said lifting head and said elevating platform and on which said truck is adapted for movement when said elevating platform is in its lowered position relatively to said lifting head, lifting wheels, means mounting said lifting wheels for movement bodily relatively to said platform and for lifting said platform when said wheels are lowered relatively to said platform, and means whereby said mounting means are maintained with the lowermost portions of the peripheries of said lifting wheels above the plane of corresponding portions of said support wheels when said elevating platform is in its lowered position relatively to said lifting head.

5. In a truck of the class described, a lifting head, an elevating platform, means mounting said elevating platform for lifting movement relatively to said lifting head, support wheels for said truck mounted on said lifting head and said elevating platform and on which said truck is adapted for movement when said elevating platform is in its lowered position relatively to said lifting head, lifting wheels for said elevating platform, means mounting said lifting wheels for vertical movement relatively to said platform whereby to lift the said elevating platform relatively to said lifting head when said wheels are lowered relatively to said elevating platform, and means for effecting the lowering movement of said lifting wheels relatively to said elevating platform to lift said elevating platform and thereby to lift off the ground the supporting wheels mounted on said elevating platform as said lifting wheels assume the load of said elevating platform and for maintaining said lifting wheels with the lowermost portions of their peripheries above corresponding portions of the peripheries of said support wheels when said elevating platform is in an initial lowered position whereby not to interfere with the movement of said truck on said support wheels.

6. In a truck of the class described, a lifting head, an elevating platform, means mounting said elevating platform for lifting movement relatively to said lifting head, support wheels for said truck mounted on said lifting head and the front end of said elevating platform and on which said truck is adapted for movement when said elevating platform is in its lowered position, lifting wheels mounted for lowering movement relatively to the rear end of said platform whereby to lift said platform relatively to said lifting head, lifting means for effecting the lowering movement of said lifting wheels relatively to said elevating platform whereby to lift off the ground the support wheels mounted on said elevating platform as said lifting wheels lift said elevating platform, and means whereby said lifting wheels are positioned off the ground with the lowermost portions of the peripheries of said lifting wheels above the plane of corresponding portions of said support wheels when said support wheels are against the ground and said elevating platform is in an initial lowered position whereby not to interfere with the movement of said truck on said support wheels.

7. In a truck of the class described, a lifting head, an elevating platform, means mounting the forward end of said elevating platform for lifting movement relatively to said lifting head, support wheels for said truck mounted on said lifting head and said elevating platform and on which said truck is adapted for movement when said elevating platform is in its lowered position, lifting wheels for said elevating platform, means mounting said lifting wheels for vertical movement relatively to the rear of said elevating platform whereby to lift the said elevating platform relatively to said lifting head when said wheels are moved downwardly relatively to said elevating platform, means whereby said mounting means are maintained with the lowermost portions of the peripheries of said lifting wheels above the plane of corresponding portions of said support wheels when said elevating platform is in its lowered position relatively to said lifting head, and means whereby said lifting means lifts the forward end of said elevating platform and said support wheels therewith while effecting the lowering movement of said lifting wheels relatively to said elevating platform.

8. In a truck of the class described, a lifting head, an elevating platform, means mounting the forward end of said elevating platform for lifting movement relatively to said lifting head, support wheels for said truck mounted on said lifting head and said elevating platform and on which said truck is adapted for movement when said elevating platform is in its lowered position, lifting wheels for said elevating platform, means mounting said lifting wheels for vertical movement relatively to said platform whereby to lift the said elevating platform relatively to said lifting head when said wheels are lowered relatively to said elevating platform, means whereby said mounting means are maintained with the lowermost portions of the peripheries of said lifting wheels above the plane of corresponding portions of said support wheels when said elevating platform is in its lowered position relatively to said lifting head, lifting means on said lifting head, means whereby said lifting means apply lifting effort directly to the forward end of said elevating platform to lift said platform and its support wheels, and means whereby the said lifting means effects also the lowering movement of said lifting wheels relatively to said elevating platform to lift the rear end of said platform as the front end of said platform is lifted.

9. In a truck of the class described, a lifting head, an elevating platform, means mounting said elevating platform for lifting movement relatively to said lifting head, support wheels for said truck mounted on said lifting head and said elevating platform and on which said truck is adapted for movement when said elevating platform is in its lowered position, lifting wheels for said elevating platform, means mounting said lifting wheels for vertical movement relatively to said platform whereby to lift the said elevating platform relatively to said lifting head when said wheels are lowered relatively to said elevating platform, said lifting wheels being positioned off the ground when said elevating platform and lifting means are in an initial lowered position whereby not to interfere with the movement of said truck on said support wheels, lifting means on said lifting head, means whereby said lifting means apply lifting effort directly to the forward end of said elevating platform to lift said platform and its support wheels, means whereby the said lifting means effects the lowering movement of said lifting wheels relatively to said elevating platform to lift the rear end of said platform as the front end of said platform is lifted whereby to transfer the load of said elevating platform to said lifting wheels from the said support wheels, the said means whereby said lifting wheels are moved being formed to effect a relatively faster initial movement thereof than is imparted to the forward end of said elevating platform so that said wheels may quickly contact the ground to begin the lifting of the rear end of said elevating platform.

10. In a truck of the class described, a lifting head, an elevating platform, means mounting said elevating platform for lifting movement relatively to said lifting head, support wheels for said truck mounted on said lifting head and said elevating platform and on which said truck is adapted for movement when said elevating platform is in its lowered position, lifting wheels for said elevating platform, means mounting said lifting wheels for vertical movement relatively to said platform whereby to lift the said elevating platform relatively to said lifting head when said wheels are lowered relatively to said elevating platform, springs pressing said lifting wheels upwardly off the ground with the lowermost portions of the peripheries of said lifting wheels above the plane of corresponding portions of said support wheels when said elevating platform and lifting means are in a initial lowered position whereby not to interfere with the movement of said truck on said support wheels, lifting means, means whereby said lifting means apply lifting effort directly to the forward end of said elevating platform to lift said platform and its support wheels, and means whereby the lifting of the forward end of said elevating platform by said lifting means effects also the movement of said lifting wheels to lift the rear end of said platform and to transfer the load of said elevating platform to said lifting wheels from the said support wheels.

11. In a truck of the class described, a lifting head, an elevating platform, means mounting said elevating platform for lifting movement relatively to said lifting head, support wheels for said lifting head, support wheels mounted on said elevating platform and adapted to contact the ground when said elevating platform is in its lowered position relatively to said lifting head whereby said truck may move about on said support wheels, lifting wheels for said elevating platform movably mounted on said elevating platform and adapted to lie in spaced relation to the ground with the lowermost portions of the peripheries of said lifting wheels above the plane of corresponding portions of said support wheels when said elevating platform is in its lowered position and supported by said support wheels, and means for moving said lifting wheels relatively to said elevating platform whereby to elevate said platform and its support wheels relatively to said lifting head.

12. In a truck of the class described, a lifting head, an elevating platform, means mounting said elevating platform for lifting movement relatively to said lifting head, support wheels for said lifting head, support wheels mounted on the front end of said elevating platform and adapted to contact the ground when said elevating platform is in its lowered position relatively to said lifting head wherey said truck may move about on said support wheels, lifting wheels for said elevating platform movably mounted on said elevating platform and adapted to lie in spaced relation to the ground when said elevating platform is in its lowered position, lifting means on said lifting head, means whereby said lifting means lifts the forward end of said elevating platform and therefore said support wheels mounted on said platform, means whereby the said lifting means effects also the movement of said lifting wheels to lift the rear end of said elevating platform whereby to accept the load of said platform from said support wheels, said means being formed so that at least the preliminary movement of said lifting wheels is faster than the lifting movement imparted to the front end of said elevating platform.

13. In a truck of the class described, a lifting head, an elevating platform, means mounting said elevating platform for lifting movement relatively to said lifting head, support wheels for said lifting head, support wheels mounted on said elevating platform and adapted to contact the ground when said elevating platform is in its lowered position relatively to said lifting head whereby said truck may move about on said support wheels, lifting wheels for said elevating platform movably mounted on said elevating platform, springs adapted to press said lifting wheels whereby to maintain said wheels in spaced relation to the ground with the lowermost portions of the peripheries of said lifting wheels above the plane of corresponding portions of said support wheels when said elevating platform is in its lowered position, and means for moving said lifting wheels relatively to said elevating platform whereby to elevate said platform and its support wheels relatively to said lifting head and to accept the load thereof from said support wheels.

14. In a truck of the class described, a lifting head, an elevating platform, means mounting said elevating platform for lifting movement relatively to said lifting head, support wheels for said lifting head, support wheels mounted on the front end of said elevating platform and adapted to contact the ground when said elevating platform is in its lowered position relatively to said lifting head whereby said truck may move about on said support wheels, a spring pressing said elevating platform toward its lowered position, lifting wheels for said elevating platform movably mounted on said elevating platform, springs adapted to press said wheels whereby to maintain said wheels in spaced relation to the ground with the lowermost portions of the peripheries of said lifting wheels above the plane of corresponding portions of said support wheels when said elevating platform is in its lowered position, lifting means for lifting said elevating platform relatively to said lifting head, means whereby said lifting means lifts the forward end of said elevating platform and therefore said support wheels mounted on said platform, and means whereby said lifting means effects also the movement of said lifting wheels to lift the rear end of said elevating platform and to accept the load of said platform from said support wheels.

15. In a truck of the class described, a lifting head, an elevating platform, means mounting said elevating platform for lifting movement relatively to said lifting head, support wheels for said truck mounted on said lifting head and the front end of said elevating platform and on which said truck is adapted for movement when said elevating platform is in its lowered position, lifting wheels for said elevating platform, links mounting said lifting wheels for pivotal movement relatively to said elevating platform, springs pressing said wheels normally into a position spaced from the ground with the lowermost portions of the peripheries of said lifting wheels above the plane of corresponding portions of said support wheels when said elevating platform is in its lowered position and supported by said support wheels, lifting means on said lifting head, means whereby said lifting means lift the front end of said elevating platform relatively to said lifting head, cam means actuated during the lifting movement of the forward end of said elevating platform, and means of connection between said links and said cam means whereby said links are actuated by said cam means to move the lifting wheels to raise the rear end of said elevating platform as said forward end and its support wheels are lifted.

16. In a truck of the class described, a lifting head, an elevating platform, means mounting said elevating platform for lifting movement relatively to said lifting head, support wheels on said elevating platform and on said lifting head on which said truck is adapted for movement when said elevating platform is in its lowered position, lifting wheels mounted for lowering movement relatively to said platform and adapted to lift said platform relatively to said lifting head when lowered, a hydraulic lifting assembly comprising a cylinder and a lifting ram in said cylinder, means mounting the cylinder on said lifting head and securing the ram directly to said elevating platform so that movement of said ram in said cylinder lifts the elevating platform, means whereby the said movement of said ram effects also the movement of said lifting wheels, and means whereby said lifting wheels are positioned off the ground with the lowermost portions of the peripheries of said lifting wheels above the plane of corresponding portions of said support wheels when said elevating platform and hydraulic lifting assembly are in an initial lowered position.

17. In a truck of the class described, a lifting head, an elevating platform, means mounting the front end of said elevating platform for lifting movement on said lifting head with the said platform extending rearwardly from said mounting means and forming an overhanging platform portion spaced from the ground, at least one support wheel for said lifting head, support wheels mounted on said elevating platform and cooperating with said first support wheel to support said truck, and lifting means for lifting said elevating platform relatively to said lifting head whereby to lift also said platform support wheels, said lifting means including lifting wheels movably mounted on said elevating platform and, means for moving said wheels from a position spaced from the ground and with the lowermost portions of the peripheries of said lifting wheels above the plane of corresponding portions of said support wheels to a position against the ground whereby to accept the weight of said elevating platform.

18. In a truck of the class described, a wheel supported lifting head, an elevating platform, means mounting the front end of said elevating platform for elevating movement on said lifting head and with the rear end of said platform held spaced from the ground when said platform is in its lowered position on said lifting head, support wheels mounted on the front end of said elevating platform and lying against the ground when said platform is fully lowered relatively to said lifting head, means pressing said elevating platform downwardly into its lowered position whereby to maintain its support wheels against the ground, lifting wheels movably mounted on the rear end of said elevating platform, means maintaining said lifting wheels off the ground with the lowermost portions of the peripheries of said lifting wheels above the plane of corresponding portions of said support wheels when said platform is lowered relatively to said lifting head, lifting means for lifting the forward end of said elevating platform relatively to said lifting head, and means whereby operation of said lifting means effects the movement of said lifting wheels for lowering said lifting wheels against the ground to relieve said platform support wheels of the load of said elevating platform.

19. In a truck of the class described, a lifting head, an elevating platform, means mounting said elevating platform for lifting movement relatively to said lifting head, support wheels for said truck mounted on said lifting head and said elevating platform and on which said truck is adapted for movement when said elevating platform is in its lowered position, lifting wheels mounted for movement relatively to said platform and adapted to lift said platform relatively to said lifting head when so moved, lifting means for effecting the movement of said lifting wheels, and means whereby said lifting wheels are positioned off the ground when said elevating platform is in said lowered position with the lowermost portions of the peripheries of said lifting wheels above the plane of corresponding portions of said support wheels whereby not to interfere with the movement of said truck on said support wheels.

20. In a truck of the class described, a lifting head, an elevating platform, means mounting the front end of said elevating platform for lifting movement on said lifting head with the said platform extending rearwardly from said mounting means and forming an overhanging platform portion spaced from the ground, at least one support wheel for said lifting head, support wheels mounted on said elevating platform and cooperating with said first support wheel to support said truck for movement when said elevating platform is in its lowered position relatively to said lifting head, lifting wheels mounted on the overhanging portion of said platform for vertical movement relatively to said platform, means whereby said lifting wheels are held upwardly relatively to said elevating platform and spaced from the ground with the lowermost portions of the peripheries of said lifting wheels above the plane of corresponding portions of said support wheels when said elevating platform is in its lowered position, lifting means, and means whereby said lifting means lifts the forward end of said platform and moves said lifting wheels to lift the rear end of said elevating platform.

21. In a truck of the class described, a wheel supported lifting head, a wheel supported elevating platform, means mounting said elevating platform for lifting movement relatively to said lifting head, lifting wheels movably mounted under the rear of said elevating platform, means for moving said lifting wheels downwardly as the said platform is lifted by said lifting means whereby to lift also the rear of said truck, and said means holding said lifting wheels upwardly away from the ground with the lowermost portions of the peripheries of said lifting wheels above the plane of corresponding portions of said support wheels when said elevating platform is in its fully lowered position.

22. In a truck of the class described, a lifting head, an elevating platform, means mounting said elevating platform for lifting movement relatively to said lifting head, lifting means for lifting said elevating platform relatively to said lifting head on said mounting means, intermediate wheels mounted on said elevating platform and positioned against the ground when said elevating platform is in its lowered position relatively to said lifting head, and off the ground when said elevating platform is lifted relatively to said lifting head, lifting wheels for the rear of said elevating platform, wheel carrying means for supporting said lifting wheels and movably mounted under the rear of said platform for lifting the rear of said elevating platform when moved downwardly relatively thereto, means whereby when said elevating platform is lowered relatively to said lifting head said wheel carrying means are maintained in a position with said lifting wheels off the ground with the lowermost portions of the peripheries of said lifting wheels above the plane of corresponding portions of said support wheels, and means whereby the operation of said lifting means effects the movement of said wheel carrying means to lower the said lifting wheels against the ground and to lift the rear of said platform.

23. In a truck of the class described, a lifting head, an elevating platform, means mounting the forward end of said elevating platform for lifting movement relatively to said lifting head, support wheels mounted on said lifting head and on said elevating platform for supporting said lifting head and platform when said platform is in its lowered position relatively to said lifting head, lifting means for lifting said elevating platform relatively to said lifting head, a lifting wheel link, means rotatably mounting said lifting wheel link on the underside of the rear of said elevating platform for lifting said platform, a lifting wheel mounted on said lifting wheel link, a tension member extending under the elevating platform for rotating said lifting wheel link in a downward direction, and means whereby when said elevating platform is in said lowered position said tension member and said lifting wheel link are positioned so that said lifting wheel is off the ground with the lowermost portion of the periphery of said lifting wheel above the plane of corresponding portions of said support wheels.

24. In a truck of the class described, a lifting head, an elevating platform, means mounting the forward end of said elevating platform for lifting movement relatively to said lifting head, support wheels mounted on said lifting head and on said elevating platform for supporting said lifting head and platform when said platform is in its lowered position relatively to said lifting head, lifting means for lifting said elevating platform relatively to said lifting head, a lifting wheel link, means rotatably mounting said lifting wheel link on the underside of the rear of said elevating platform for lifting said platform, a lifting wheel mounted on said lifting wheel link, a tension member extending under the elevating platform for rotating said lifting wheel link in a downward direction, means whereby when said elevating platform is in said lowered position said tension member and said lifting wheel link are positioned so that said lifting wheel is off the ground with the lowermost portion of the periphery of said lifting wheel above the plane of corresponding portions of said support wheels, and means whereby the operation of said lifting means effects the movement of said tension member to move said lifting link to lift the rear of said elevating platform.

HERBERT J. FRAMHEIN.

REFERENCES CITED

The following references are of record in the file of this patent:

UNITED STATES PATENTS

| Number | Name | Date |
| --- | --- | --- |
| 2,274,164 | Quayle | Feb. 24, 1942 |
| 2,234,925 | Hastings | Mar. 11, 1941 |
| 2,110,424 | Quayle | Mar. 8, 1938 |
| 1,997,327 | Warshaw | Apr. 9, 1935 |
| 1,890,361 | Beattie | Dec. 6, 1932 |
| 1,630,619 | Kimber | May 31, 1927 |